(12) United States Patent
Despesse

(10) Patent No.: US 9,948,095 B2
(45) Date of Patent: Apr. 17, 2018

(54) COMBINED CONTROL OF TWO VOLTAGE SOURCES

(71) Applicant: COMMISSARIAT A L'ENERGIE ATOMIQUE ET AUX ENERGIES ALTERNATIVES, Paris (FR)

(72) Inventor: Ghislain Despesse, Saint Egreve (FR)

(73) Assignee: COMMISSARIAT A L'ENERGIE ATOMIQUE ET AUX ENERGIES ALTERNATIVES, Paris (FR)

(*) Notice: Subject to any disclaimer, the term of this patent is extended or adjusted under 35 U.S.C. 154(b) by 678 days.

(21) Appl. No.: 14/373,239

(22) PCT Filed: Jan. 23, 2013

(86) PCT No.: PCT/EP2013/051226
§ 371 (c)(1),
(2) Date: Jul. 18, 2014

(87) PCT Pub. No.: WO2013/110649
PCT Pub. Date: Aug. 1, 2013

(65) Prior Publication Data
US 2014/0361626 A1 Dec. 11, 2014

(30) Foreign Application Priority Data
Jan. 23, 2012 (FR) ...................... 12 50626

(51) Int. Cl.
*H02J 1/00* (2006.01)
*H02J 3/00* (2006.01)
(Continued)

(52) U.S. Cl.
CPC .............. *H02J 1/06* (2013.01); *B60L 3/0046* (2013.01); *B60L 11/126* (2013.01);
(Continued)

(58) Field of Classification Search
CPC ...... B60W 20/00; B60W 10/08; B60W 10/06; B60W 10/30; H02J 7/34; H02J 7/00; H02M 3/335; G05F 3/08
(Continued)

(56) References Cited

U.S. PATENT DOCUMENTS 6,507,506 B1 * 1/2003 Pinas .................. B60L 11/1851
307/10.1
8,587,252 B2 11/2013 Reggio et al.
(Continued)

FOREIGN PATENT DOCUMENTS

DE 102009028965 A1 3/2011
EP 2374651 A2 10/2011
(Continued)

OTHER PUBLICATIONS

International Search Report (Form PCT/ISA/210) and Written Opinion (Form PCT/ISA/237) dated Oct. 10, 2014, issued in corresponding international application No. PCT/EP2013/051226; with partial English translation and machine-translation (16 pages).

*Primary Examiner* — Fritz M Fleming
*Assistant Examiner* — Jagdeep Dhillon
(74) *Attorney, Agent, or Firm* — Westerman, Hattori, Daniels & Adrian, LLP

(57) ABSTRACT

Electrical management system comprising a first voltage source linked to a load and a second voltage source at lower voltage, characterized in that the second voltage source and/or an associated charger can be arranged in series with the first voltage source and the load.

26 Claims, 12 Drawing Sheets

(51) Int. Cl.
*H02J 1/06* (2006.01)
*B60L 3/00* (2006.01)
*B60L 11/12* (2006.01)
*B60L 11/18* (2006.01)
*H02J 7/00* (2006.01)

(52) U.S. Cl.
CPC ....... *B60L 11/1803* (2013.01); *B60L 11/1816* (2013.01); *B60L 11/1866* (2013.01); *B60L 11/1868* (2013.01); *B60L 11/1887* (2013.01); *H02J 1/00* (2013.01); *H02J 7/0068* (2013.01); *B60L 2210/10* (2013.01); *B60L 2240/545* (2013.01); *H02J 2001/008* (2013.01); *Y02T 10/6217* (2013.01); *Y02T 10/7005* (2013.01); *Y02T 10/7061* (2013.01); *Y02T 10/7066* (2013.01); *Y02T 10/7072* (2013.01); *Y02T 10/7077* (2013.01); *Y02T 10/7094* (2013.01); *Y02T 10/7216* (2013.01); *Y02T 90/127* (2013.01); *Y02T 90/14* (2013.01); *Y02T 90/34* (2013.01); *Y10T 307/685* (2015.04)

(58) Field of Classification Search
USPC ........................ 307/64–66, 9.1–10.6, 80–87; 320/116–118, 159–163; 701/22–26; 903/903; 363/16–18; 323/309–311
See application file for complete search history.

(56) References Cited

U.S. PATENT DOCUMENTS

| | | | |
|---|---|---|---|
| 2003/0002304 A1* | 1/2003 | Zhu | H02M 1/34 363/56.02 |
| 2006/0232238 A1 | 10/2006 | Horii | |
| 2010/0231178 A1* | 9/2010 | Handa | H02J 7/0065 320/163 |
| 2011/0048825 A1 | 3/2011 | Starr | |
| 2011/0127962 A1* | 6/2011 | Murao | H02J 7/0016 320/118 |
| 2011/0176343 A1* | 7/2011 | Kojima | B60L 11/185 363/132 |
| 2011/0288708 A1* | 11/2011 | Katono | B60K 1/04 701/22 |
| 2012/0001480 A1 | 1/2012 | Favaretto et al. | |
| 2012/0025601 A1* | 2/2012 | Nefcy | F02N 11/0866 307/9.1 |
| 2012/0105065 A1* | 5/2012 | Namou | G01R 31/3275 324/415 |
| 2012/0126742 A1 | 5/2012 | Reggio et al. | |
| 2012/0153722 A1* | 6/2012 | Nazarian | H02J 3/32 307/23 |
| 2012/0171564 A1* | 7/2012 | Jagannathan | H01M 4/14 429/205 |
| 2012/0187759 A1 | 7/2012 | Kamichi et al. | |
| 2012/0206109 A1 | 8/2012 | Fassnacht et al. | |
| 2012/0223581 A1* | 9/2012 | Conrad | A47L 9/2831 307/77 |
| 2012/0248881 A1* | 10/2012 | Chang | B60L 11/1866 307/87 |
| 2012/0307526 A1* | 12/2012 | Senanayake | H02M 3/158 363/16 |
| 2013/0009461 A1 | 1/2013 | Reichow et al. | |

FOREIGN PATENT DOCUMENTS

| | | | |
|---|---|---|---|
| EP | 2388902 A1 | 11/2011 | |
| EP | 2479091 A1 | 7/2012 | |
| TW | 201116442 A | 5/2011 | |
| WO | 2009/021909 A1 | 2/2009 | |
| WO | 2011/016135 A1 | 2/2011 | |
| WO | 2011121035 A1 | 10/2011 | |
| WO | WO 2011121035 A1 * | 10/2011 | ............ H02J 7/0029 |

* cited by examiner

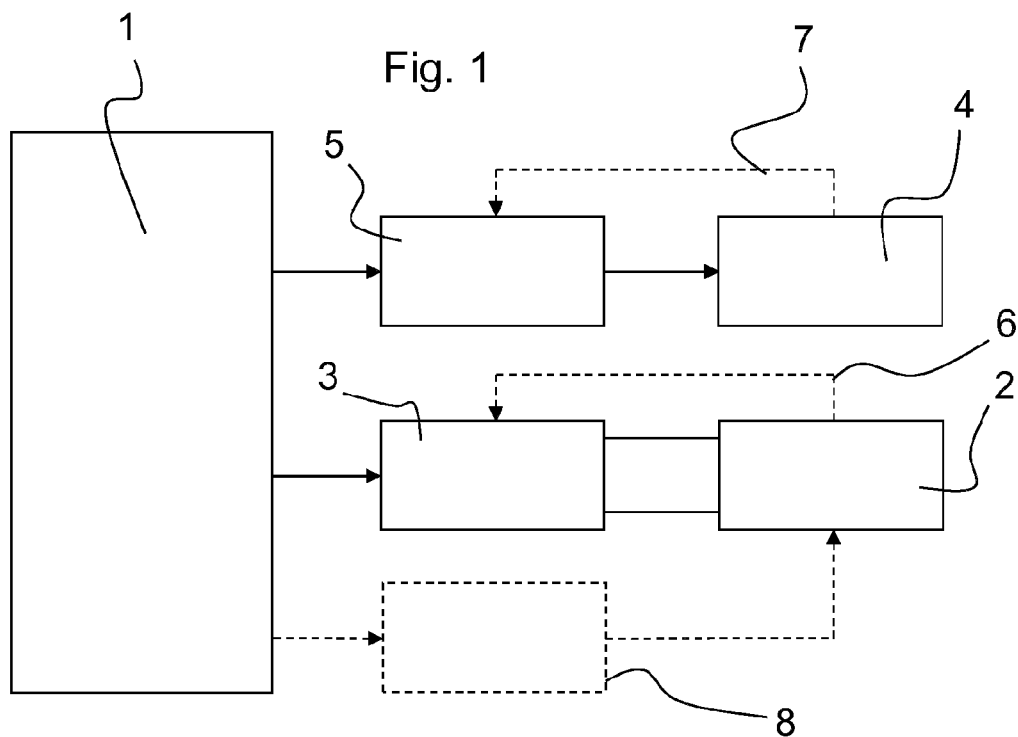
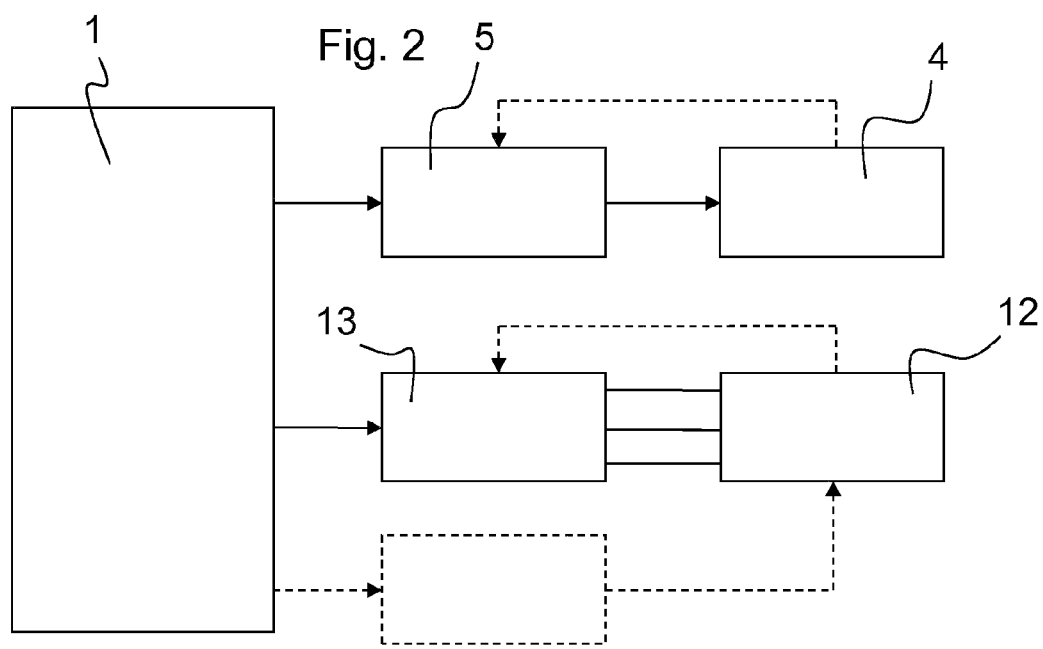

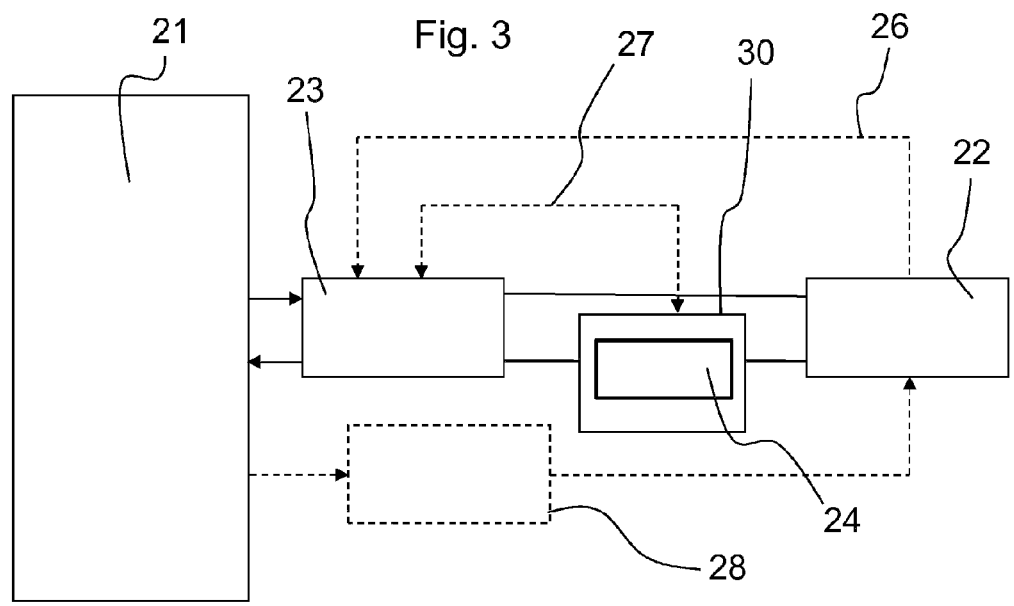
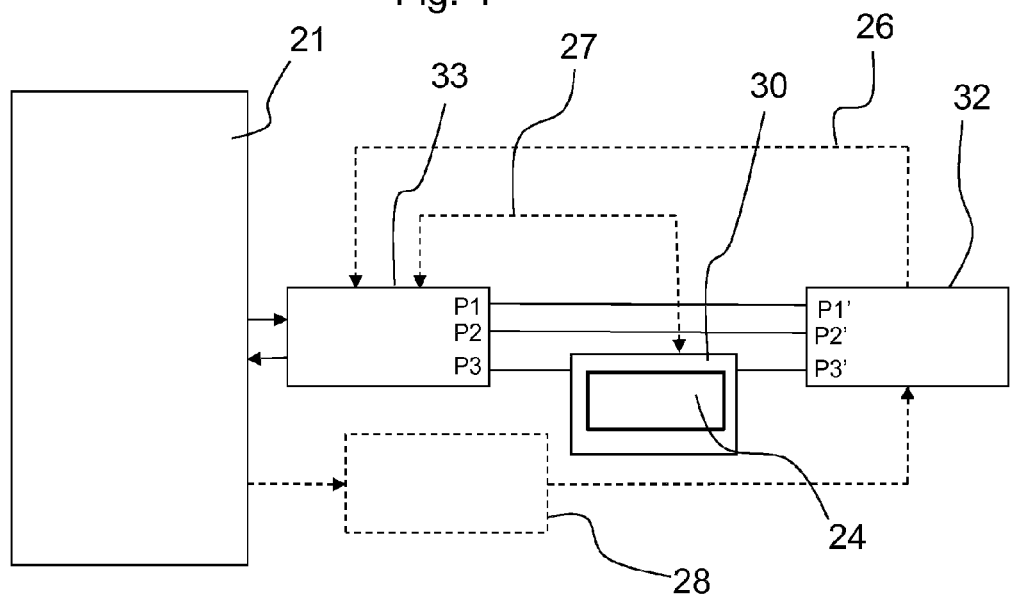

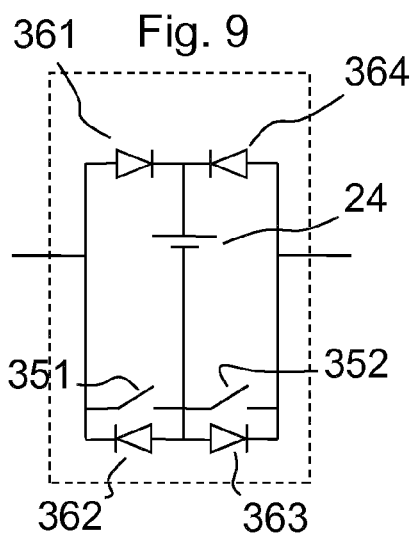
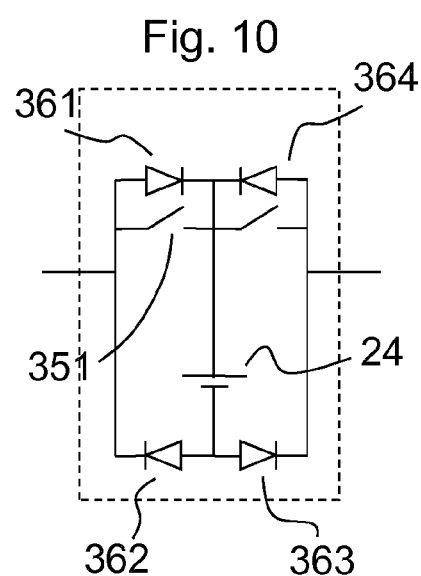
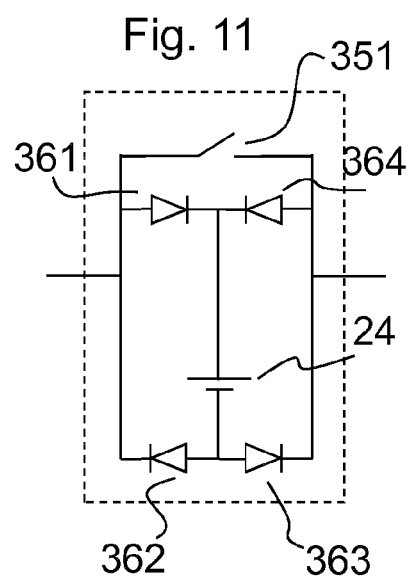

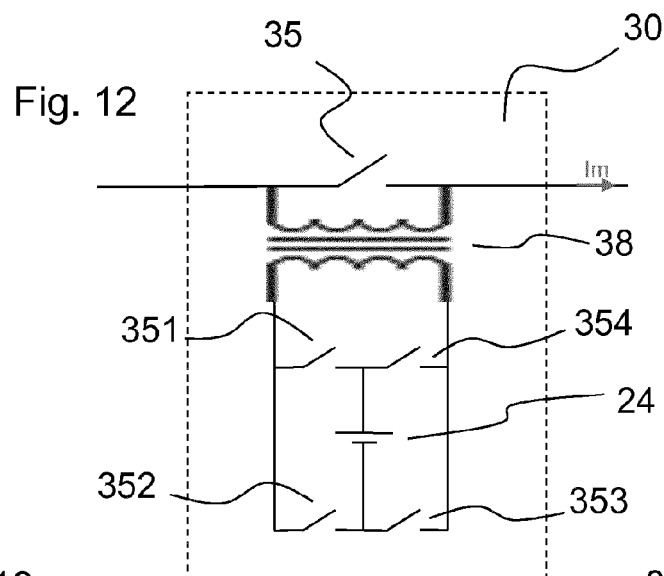
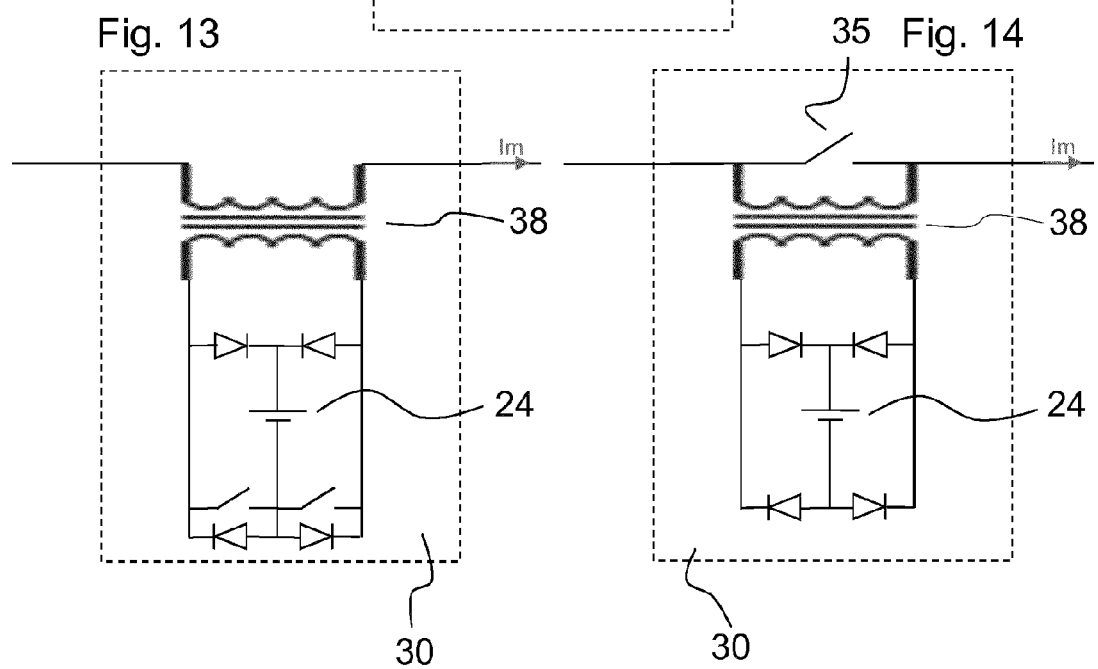
Fig. 12
Fig. 13
Fig. 14

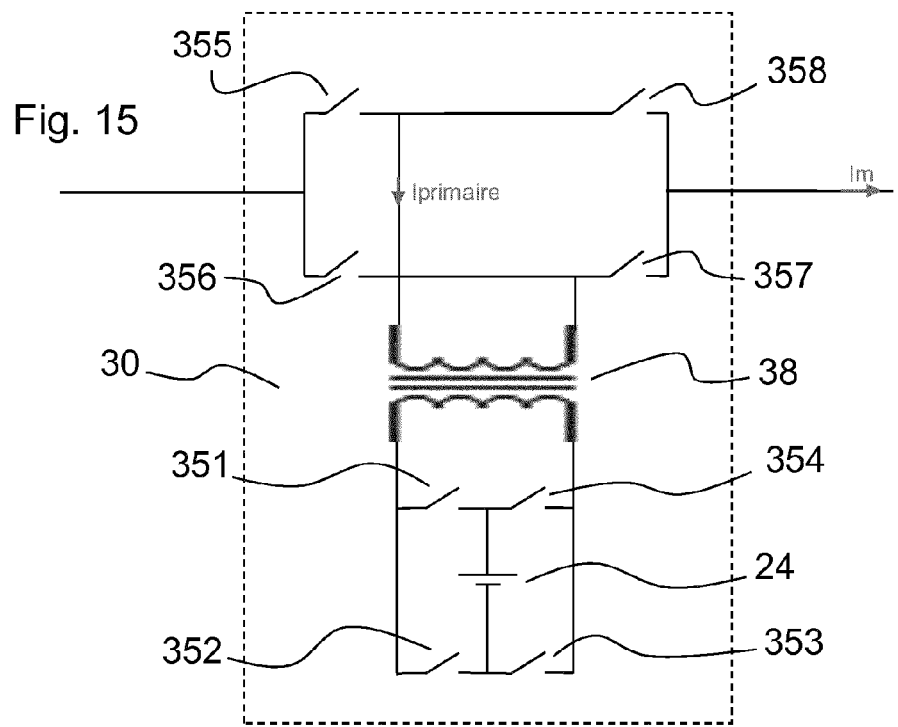
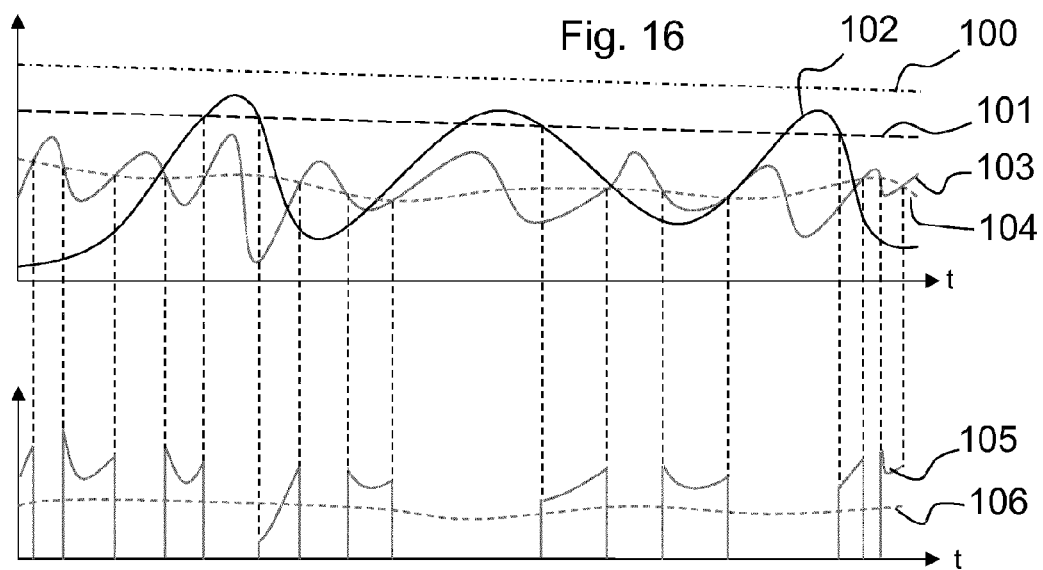

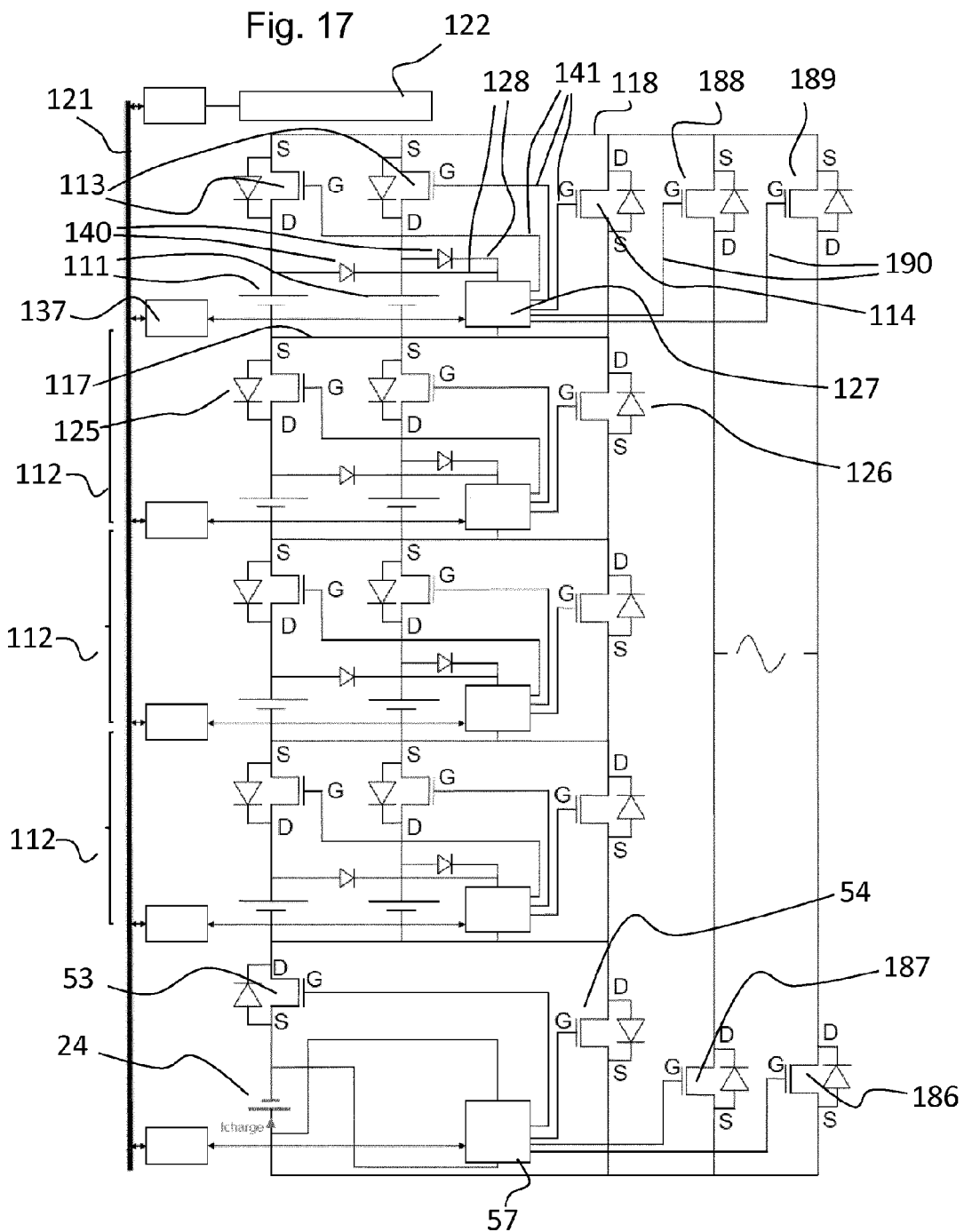

COMBINED CONTROL OF TWO VOLTAGE SOURCES

The invention relates to an electrical management system comprising two voltage sources of different voltage levels, low and high, which is particularly suitable for an automotive vehicle. It also pertains to a system such as an automotive vehicle per se comprising such an electrical management system. Finally, it also pertains to a method of management of such an electrical system.

An automotive vehicle with electric, totally electric or hybrid propulsion has a power battery which operates with a first level of high voltage, which may for example reach 300 V, so as to be able to electrically power the automotive vehicle's propulsion motor. For this reason, we call such a battery a propulsion battery. Such an automotive vehicle is moreover equipped in a conventional manner with an onboard battery, which operates with a second voltage level, smaller than the first, of low voltage, which may for example be of the order of 12 V. The function of this onboard battery is the electrical powering of all the other lower-consumption electrical components of the vehicle. Such an automotive vehicle must manage its two different batteries, manage their charging and discharging phase and guarantee that they deliver the power required by the automotive vehicle at any instant.

FIG. 1 represents a first solution of the prior art, in which an electric automotive vehicle comprises a propulsion battery 1 designed for the energizing of a DC propulsion motor 2 by way of a DC/DC converter 3. The propulsion motor 2 can upload certain information representing its state through a communication link 6 so as to allow intelligent management of its energizing. In such a solution, the onboard battery 4 of the automotive vehicle is also linked to the propulsion battery 1 of the automotive vehicle, which fulfils a second function of charging the onboard battery 4, by way of a second DC/DC converter 5, which fulfils a function of charger for the onboard battery 4. This second DC/DC converter 5 has a first effect of adjusting the voltage and/or the current transmitted to the onboard battery 4 so as to allow its charging under optimal conditions, and its second effect is to ensure galvanic isolation between the propulsion battery 1 and the onboard battery 4. The latter transmits information about its state through a communication link 7 so as to implement intelligent management of its operation, in particular of its recharging. Finally, in an optional manner in the case where the propulsion motor employs coiled excitation, the system comprises a third DC/DC converter 8 linked to the propulsion motor 2.

FIG. 2 represents a second solution of the prior art, which differs from the previous solution in that the propulsion motor 12 of the automotive vehicle is a three-phase, asynchronous motor, or for example of such type as synchronous with permanent magnet or synchronous with coiled excitation, which is linked to the propulsion battery 1 by way of an inverter 13. The remainder of the system remains similar to the first solution described hereinabove.

Existing solutions for managing the partnering of two batteries of different voltage levels in an automotive vehicle are insufficient and use a complex and expensive electrical management system and non-optimized methods.

Thus, a need exists for an improved solution for managing the partnering of two batteries of different voltage levels within one and the same system.

For this purpose, the invention rests upon an electrical management system comprising a first voltage source linked to a load by a linking circuit and a second voltage source at lower voltage, characterized in that the second voltage source (and/or an associated charger) can be arranged in series with the first voltage source and the load so that its series linking causes a voltage drop over the linking circuit linking the first voltage source to the load.

The linking circuit can comprise a first link linking a first terminal of the first voltage source to a first terminal of the load, and a second link linking a second terminal of the first source to a second terminal of the load, the second voltage source being arranged in series with one of the first or second links.

The electrical management system can comprise an inverter and/or a DC/DC converter, electrically attached to the first voltage source upstream of the second voltage source or electrically attached to the load downstream of the second voltage source.

The second voltage source can be an onboard battery and the system can comprise a charger arranged in series with the linking circuit linking the first voltage source and the load able to allow the charging of the onboard battery, its by-passing, and/or its isolation.

The invention also pertains to an electric or hybrid automotive vehicle characterized in that it comprises an electrical management system such as described above, the first voltage source being the vehicle propulsion battery, the load being its propulsion motor, and its second voltage source its onboard battery.

The invention also pertains to a photovoltaic device, characterized in that it comprises an electrical management system such as described above, the first voltage source being an electrical generating device comprising photovoltaic cells, the load being an electrical network, and its second voltage source being a battery or a photovoltaic device which provides a low voltage to a device for managing the electrical generating device.

The invention also pertains to a method of management of an electrical management system such as described above comprising two voltage sources, characterized in that it comprises a step of linking the second low voltage source with a linking circuit linking the first voltage source and the load so that this series linking of the second voltage source causes a voltage drop over the linking circuit linking the first voltage source to the load.

The invention is more precisely defined by the claims.

These objects, characteristics and advantages of the present invention will be set forth in detail in the following description of particular embodiments given without limitation in conjunction with the appended figures among which:

FIG. 1 schematically represents a system for managing the batteries of an automotive vehicle according to a first solution of the prior art.

FIG. 2 schematically represents a system for managing the batteries of an automotive vehicle according to a second solution of the prior art.

FIG. 3 schematically represents a system for managing the batteries of an automotive vehicle according to the embodiment of the invention.

FIG. 4 schematically represents a system for managing the batteries of an automotive vehicle according to a variant of the embodiment of the invention.

FIG. 5 schematically represents a system for managing the batteries of an automotive vehicle according to another variant of the embodiment of the invention.

FIGS. 8 to 11 represent alternative variant embodiments of an onboard battery charger of an automotive vehicle suitable for the embodiments according to one of the previous embodiments.

FIGS. 12 to 15 represent alternative variant embodiments with galvanic isolation of an onboard battery charger of an automotive vehicle suitable for the embodiments according to one of the previous embodiments.

FIG. 16 represents curves of evolution of electrical quantities as a function of time during the implementation of a method of management of an electrical system according to an embodiment of the invention.

FIGS. 17 to 21 represent alternative variants of integrated architecture of the propulsion battery and of the onboard battery according to embodiments of the invention.

In the following description, the same references will be used for similar elements in the various figures, for reason of simplifying the understanding.

Figure 5:
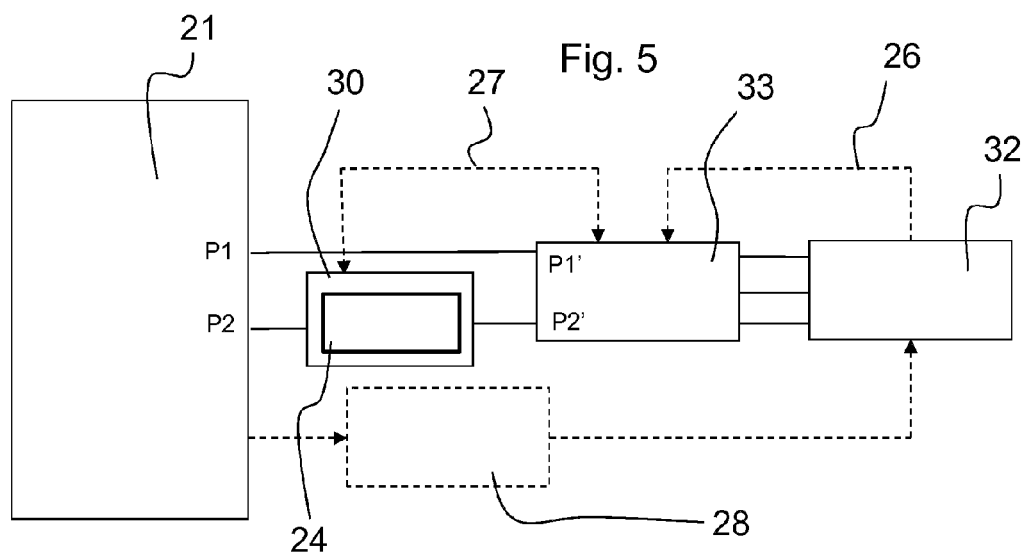

FIG. 3 thus schematically represents an embodiment of the invention, in which the system for managing the batteries of the automotive vehicle rests upon the arrangement in series with a linking circuit linking the propulsion battery 21 of the automotive vehicle and its propulsion motor 22 of a device comprising the onboard battery 24 of the vehicle, which participates in the management of the charging of this onboard battery; for this reason, we will simply call this device placed in series a charger 30. A DC/DC converter 23 is moreover linked to the propulsion battery. In a manner similar to the solution described with reference to FIG. 1, another DC/DC converter 28 can link the propulsion battery 21 to the propulsion motor 22 for the energizing of the possible excitation in the case of a motor with coiled excitation. Finally, communication links 26, 27 allow the transmission of data representing respectively the state of the propulsion motor 22 and of the onboard battery 24 to the DC/DC converter 23, which comprises hardware components and/or software components, so as to implement the intelligent management of the whole of the management system, comprising in particular the driving of the propulsion motor and of the charging of the onboard battery by way of the charger 30, as will be explained later.

FIG. 4 represents the variant of the previous embodiment in the case of a three-phase motor. In this variant, the motor is a three-phase motor 32, and the DC/DC converter 23 is replaced with an inverter 33.

By virtue of the system represented in FIGS. 3 and 4, the onboard battery 24 of the automotive vehicle can be recharged as soon as a current flows towards or from the propulsion motor 22, 32. A diversion pathway (by-pass), not represented, managed by the charger 30, optionally allows the current to pass through the onboard battery 24 of the vehicle, according to its state of charge. This system is simplified with respect to the prior art solutions represented by FIGS. 1 and 2, in particular in that it comprises one less DC/DC converter, since it does not envisage an independent converter such as this for the charging of the onboard battery 24 of the automotive vehicle. The proposed system makes it possible to place the onboard battery charging system in series with the motor energizing circuit, so as to utilize the inverter or the DC/DC energizing converter for the propulsion motor as means of adapting the voltage or the current to the needs of the onboard battery to be charged.

In the two embodiments of FIGS. 3 and 4, the inverter 33 or the DC/DC converter 23 drives the propulsion motor 32, 22 of the automotive vehicle, by way of the current which is transmitted to it. Accordingly, it automatically adjusts its output voltage so as to achieve the setpoint current of the propulsion motor, and at the same time adapts automatically to the presence or otherwise of the onboard network battery which may or may not be placed in series with the propulsion motor, by way of the charger 30. This manner of operation occurs in the limit of a saturation of the output voltage of the inverter 33 or of the DC/DC converter 23. If this saturation is approached or if the battery of the onboard network is sufficiently charged, this battery may be by-passed, isolated from the remainder of the system.

If the propulsion motor is in fact voltage-controlled, the inverter 33 or the DC/DC converter 23 is informed of the placement in series or otherwise of the onboard battery 24 so as to take it into account and to compensate on its output the voltage drop associated with the series placement of the onboard battery.

FIG. 5 represents a variant embodiment of the embodiment of FIG. 4, in which the inverter 33 is arranged between the charger 30 linked to the onboard battery 24 and the propulsion motor 32. This variant exhibits in particular the advantage of integrating the charger 30 of the onboard battery 24 in a power path with two wires only (inversion of the current only on braking), and not in the three-phase system which can exhibit greater reactive power and render the management of the recharging of the battery more complex (possible transient inversion of the current at each electrical period). Thus, it is more generally apparent that the charger 30 of the onboard battery 24 can be placed upstream or downstream of the DC/DC converter or of the inverter serving for the powering of the motor or of its excitation, in the embodiments of FIGS. 3 and 4.

Figure 6:
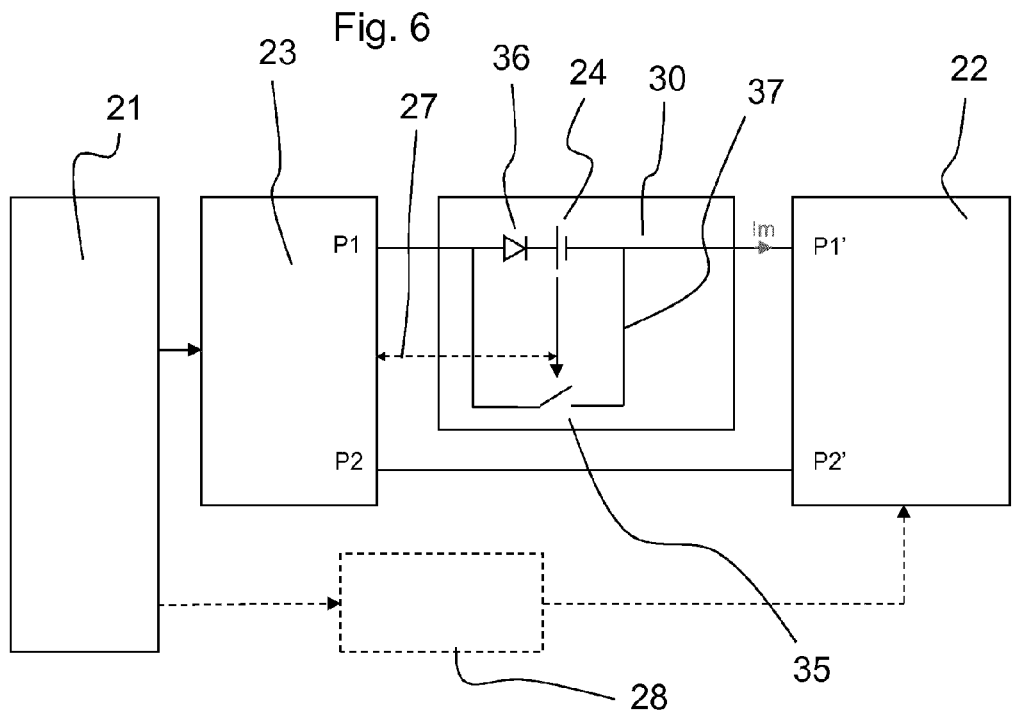
FIG. 6 represents details of the system for managing the batteries of an automotive vehicle according to the embodiment of FIG. 3.

FIG. 6 represents in greater detail a possible linkage between the charger 30 and the onboard battery 24 in the embodiment of FIG. 3. This charger 30 comprises a diode 36 and a switch 35 on a diversion pathway 37 of the onboard battery 24. The diode 36 is in series with the onboard battery 24 and makes it possible to guarantee the passage of a positive current Im for charging the onboard battery 24. This diode may as a variant be replaced with a controlled switch which is closed, and therefore passing, only when the current Im is positive. Moreover, when the switch 35 is closed, the onboard battery 24 is by-passed from the management system, is no longer linked to the propulsion battery 21 of the vehicle and the charger 30 no longer implements its charging. Naturally, an equivalent variant embodiment can be implemented in the case of a three-phase motor, according to the representation of FIG. 4, by placing the similar charger 30 in series with one of the phases of the motor or upstream of the converter and/or of the inverter, or by placing it on the motor excitation energizing line. In these embodiments, the charger 30 therefore makes it possible to arrange (or to isolate) the onboard battery 24 in series with the propulsion battery 21 and the motor 22.

Figure 7:
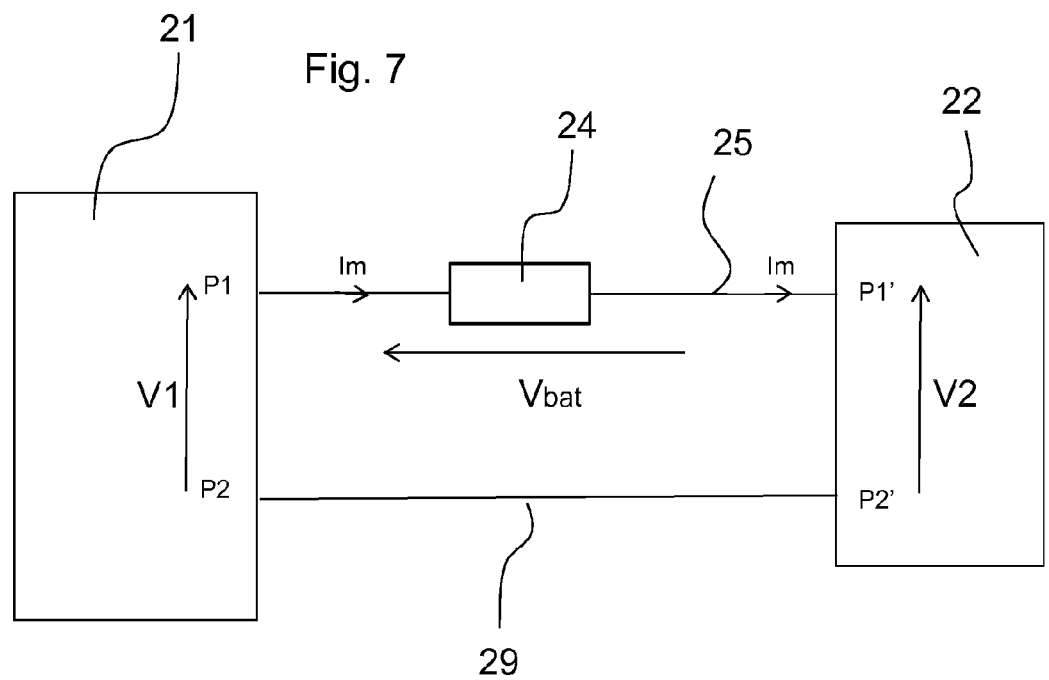
FIG. 7 represents a simplified electrical diagram of the system for managing the batteries of an automotive vehicle of the embodiments of the invention.

Lastly, FIG. 7 represents in a simplified manner the electrical diagram of the previous embodiments, in which the inverter 33 or the DC/DC converter 23 can be considered as belonging to a first voltage source (comprising the propulsion battery 21) if they are arranged upstream of the onboard battery 24, as in the embodiments represented by FIGS. 3, 4, 6, or belonging to the load 22 if they are arranged downstream of the onboard battery 24, as in the embodiment represented in FIG. 5. In all cases, the first voltage source powers the load by way of the connection of its terminals P1, P2 and optionally P3 in the three-phase case. The terminals P1, P2, P3 are at different potentials, and in the case represented in FIG. 1, the energizing voltage between the terminals P1 and P2 is called V1. In a complementary manner, the load is powered through its input terminals P1', P2' and optionally P3' raised to different potentials (potential difference V2 between the terminals P1' and P2'). This connection between the first voltage source and the load is obtained through a first link 25 linking the first terminals P1, P1' respectively of the first voltage source and the load, through a second link 29 linking their second terminals P2, P2' and optionally a third link (not represented) between the terminals P3 and P3'. A linking circuit is thus formed by the first link, second link and possible third link 25, 29 between the first voltage source and the load, through which the first voltage source powers the load. The onboard battery 24 is arranged on one of the links of this power path, in particular the first link 25 in FIG. 7, or as a variant, not represented, on the second or third link 29. In this construction, the onboard battery 24 is therefore mounted in series with the linking circuit (with a power path) disposed between the first voltage source and the load. In the example of FIG. 7, this onboard battery 24 is traversed by a current Im, which is also the energizing current for the load. It causes a voltage drop $V_{bat}$ between the terminals P1 and P2. The voltage $V_{bat}$ is added to the voltage V2 across the terminals of the load. Indeed, the following relation is satisfied in this circuit: $V1=V2+V_{bat}$. This relation between the various voltages of the power circuit is also illustrated subsequently in conjunction with FIG. 16.

As a remark, the previous explanations also apply in the case of a three-phase embodiment, as represented in FIG. 4, the onboard battery being situated on one of the three power links linking the first voltage source to the load.

FIGS. 8 to 11 represent variant embodiments of the charger 30 for the onboard battery 24 of the automotive vehicle. These variant embodiments allow in particular the recharging of the onboard battery 24 whatever the direction of the current Im in the linking circuit linking the propulsion battery 21 to the motor 22.

Figure 8:
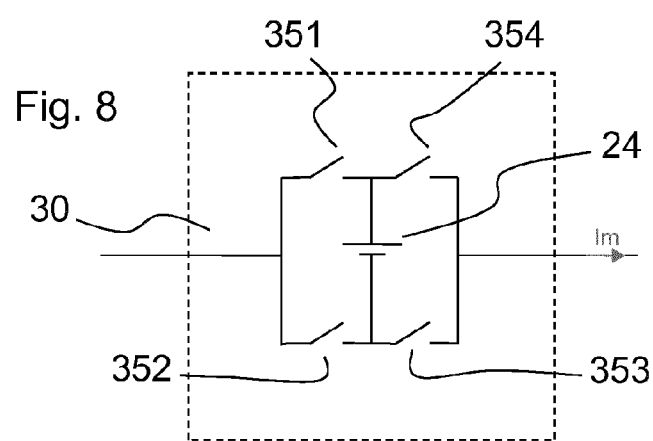

The first embodiment illustrated in FIG. 8 comprises four switches 351 to 354 laid out around the onboard battery 24. This embodiment can take the following three configurations:
  when the two switches 352 and 353 are closed and the other two 351 and 354 open, the onboard battery 24 is by-passed, isolated from the remainder of the system;
  when the current Im is positive, the closing of the switches 351 and 353 and the opening of the other two makes it possible to recharge the battery;
  when the current Im is negative, the closing of the switches 352 and 354 and the opening of the other two also makes it possible to recharge the battery.

FIGS. 9 to 11 illustrate alternative variants which make it possible to reduce the number of switches of the embodiment of FIG. 8, while obtaining a substantially equivalent manner of operation. These embodiments are based on a bridge of diodes 361 to 364, which allows the charging of the onboard battery 24 whatever the sign of the current Im, and on at least one switch 351 to allow the by-passing of the onboard battery 24.

FIGS. 12 to 15 represent variant embodiments of the charger 30 for the onboard battery 24 of the automotive vehicle. These variant embodiments allow the recharging of the onboard battery 24, in the presence of a current Im of arbitrary direction in the linking circuit between the propulsion battery and the motor, as in the previous embodiments, while ensuring galvanic isolation of the onboard battery 24 with respect to the propulsion battery 21 of the automotive vehicle, this being very advantageous for safety's sake in certain implementations as within an automotive vehicle, a portable power tool, a motorbike, an electric bus or boat, an energy storage station serving as energy buffer for the electrical network, a solar installation (the solar cells replacing the propulsion battery 1 and the charger 30 being placed upstream or downstream of the inverter which returns the energy to the mains grid), etc.

Thus, the variant embodiments, illustrated by FIGS. 12 to 15, of the charger 30 comprise a current transformer 38, whose primary circuit is arranged directly on the linking circuit linking the propulsion battery to the motor. The onboard battery 24 of the vehicle is arranged on the secondary circuit of the transformer 38, by way of components similar to the embodiments of FIGS. 8 to 11, that is to say a diode bridge and/or switches, to allow the charging of the onboard battery whatever the current Im flowing between the propulsion battery and the motor, and therefore whatever the direction of the current induced in the secondary circuit of the transformer 38.

To divert the current of the onboard battery when the latter is charged or if it is desired to avoid a voltage drop on the power line, it is possible either to close a switch 35 arranged at the level of the primary circuit, or to close the switches 352 and 353, or the switches 351 and 354 of the secondary circuit. The use of the switch 35 of the primary circuit exhibits the advantage of shunting the current transformer 38, which may exhibit a certain resistive voltage drop, at the same time as the onboard battery 24. Alternatively, the by-passing of the current at the level of the secondary circuit exhibits the advantage in certain cases of profiting from the slightly inductive behaviour of the transformer 38, which may then improve the smoothing of the current in the power path between the propulsion battery and the motor.

The transformer 38 fulfils a function of galvanic isolation of the secondary circuit, and therefore of the onboard battery 24 of the vehicle. The size of the transformer is defined as a function in particular of the frequency of the applied current: the higher the frequency of this current Im, the smaller this size may be since the less will be the risk of the transformer saturating. The transformation ratio is for its part dimensioned in such a way that the mean current at the secondary with respect to the mean current of the power path is satisfactory to maintain a sufficient charge of the onboard battery. In these embodiments, the charger 30 remains arranged in series with the propulsion battery and the motor, and allows the linking or the isolation of the onboard battery of the vehicle with the linking circuit linking the propulsion battery to the motor.

The variant of FIG. 15 comprises a device disposed in the primary circuit designed to invert the current of the primary circuit, which comprises four switches 355 to 358 in a manner similar to the solution described with reference to FIG. 8. This primary circuit allows the implementation of an inversion of the current Im flowing between the propulsion battery and the motor and entering the charger 30. This current chopping/inversion can be done at a relatively high frequency compared with the natural frequency of the current of the primary circuit (e.g.: 10 kHz), thereby making it possible to reduce the size of the transformer. The use of this primary inverter is in particular important when the current Im is continuous or quasi-continuous, or low-frequency (for example less than 50 Hz), to allow the transformer 38 to induce a current at the secondary circuit. The current Uprimary thus transmitted to the transformer 38 is equal to the current Im entering the charger 30 when the switches 355 and 357 are closed, the other two being open, and to the inverted value −Im when the switches 356 and 358 are closed, the other two being open. By alternating the closings of the pairs of switches 355, 357 and 356, 358 mentioned hereinabove, according to a high frequency of for example greater than 10 KHz, an AC current is thus generated at the level of the primary circuit which allows the transformer 38 to operate in an optimal manner. When the onboard battery 24 is charged or when it is desired to avoid a voltage drop in the system, the onboard battery 24 can be disconnected from the system for example by closing the switches 355 and 358, and/or 356 and 357 of the device disposed at the level of the primary circuit of the transformer 38 of the charger 30.

As a remark, the variant embodiments represented in FIGS. 9 to 11 may also be, as a variant, implemented at the level of the secondary circuit of the transformer 38, in replacement for the solution represented in FIG. 15, as illustrated by way of example by FIGS. 13 and 14.

As a remark, in all the previous embodiments, the switches mentioned may be of any nature, for example relays, or MOS or bipolar transistors, thyristors, MOSFETs, FETs, etc., or of diode type, and based on Silicon, Silicon carbide, Gallium Arsenide, SOI or other technologies.

The electrical management system comprises a driving block, not directly represented in the previous figures, which can correspond to any hardware and/or software means of an intelligent management unit, comprising at least one computer chip, for example one or more microprocessors, to implement a driving method. This management unit (or driving block) may be arranged or integrated within a DC/DC converter or an inverter, as mentioned previously, or be any independent unit linked to the electrical management system by a communication device. This management unit thus drives the link or otherwise of the onboard battery with the linking circuit linking the propulsion battery and the motor, in series configuration with this linking circuit or indirectly through a galvanic isolation, to achieve or otherwise a configuration of charging of the onboard battery.

This method of management of the electrical system rests firstly upon a regulating of electrical and/or mechanical parameters of the propulsion motor, such as for example a torque, a speed, an acceleration or a combination of these parameters, on the basis of a setpoint provided by a user of the system. This setpoint induces a minimum value of the voltage at the input of the DC/DC converter or of the inverter of the systems described above. The management unit authorizes or otherwise the placement in series of the onboard battery as a function of this minimum voltage, so as to prevent the voltage drop which would be caused from decreasing the voltage available for the propulsion motor under the calculated minimum value. As a supplement, the state of the onboard battery is also taken into account, since it is not necessary to place it in charging configuration if its charging is not required. Lastly, when the onboard battery, or at least its associated charger, is placed in series with the linking circuit linking the propulsion battery to the motor, the voltage drop that it causes is taken into account by the electrical management system which compensates it immediately so as to comply with the setpoint provided.

To limit any possible returns of current to the propulsion battery 21, which would be induced by the possible presence of a reactive power when the motor 22 is energized, the onboard battery may, in a favoured manner, be connected in series when this return current occurs so as to absorb a part of the associated energy. Accordingly, the management method comprises a step of detecting a return current, and takes into account such a detection to favour the linking in series of the onboard battery. This makes it possible to limit the microcycles that may be undergone by the propulsion battery if a reactive power is present in the power path upstream of the converter 23, or 33, (that is to say comprising a current which is positive over a part of the electrical period and then negative over a second part, as may arise for example when a single-phase asynchronous motor is energized).

Moreover, the charger of the onboard battery likewise comprises intelligence, by way of a computer chip and of hardware and/or software means, which implements a method of charging of the onboard battery of the vehicle by defining in particular an optimal (mean) current setpoint for the recharging of the onboard battery. This current setpoint may depend on the state of charge and/or state of health and/or the temperature of the onboard battery.

According to a first variant embodiment, the onboard battery charging method calculates a rate of placement in charging configuration (for example its placement in series or the placement in series of the charger) of the onboard battery with the propulsion battery and the motor, by taking account of the defined setpoint and of the mean current Im which flows. Accordingly, the onboard battery is alternately linked and disconnected from the linking circuit of the electrical management system according to a mean duty cycle which makes it possible to achieve an optimal compromise so as to achieve the charging of the onboard battery while disturbing to the minimum the operation of the propulsion motor. A feedback of the mean rate of placement in series of the onboard battery is implemented, so as to actually achieve the rate sought.

According to a second variant embodiment, the onboard battery charging method favours the placement in series and therefore the charging of this battery when the current Im of the system is low, to avoid high current spikes. In this case, the method comprises a step of comparing the current Im with a chosen maximum value, and links the onboard battery to the management system only if the current is less than this chosen maximum value. Naturally, this maximum current value is chosen in a manner compatible with the obtaining of the mean battery recharging current corresponding to the desired charging current setpoint.

The methods described above, like the conditions of placement in charging configuration of the onboard battery are combinable, cumulative.

FIG. 16 represents curves of evolution as a function of time of electrical parameters in a scenario chosen by way of example, to illustrate the manner of operation of the method of management of an electrical system with two batteries, such as was described above. The curve 100 represents the voltage across the terminals of the propulsion battery as a function of time t, the curve 101 this voltage decreased in the case of placement on charge of the onboard battery on account of the voltage loss caused, and the curve 102 the minimum voltage required at the input of the DC/DC converter or of the inverter as a function of the need of the motor, as explained previously. The curves 103 and 104 illustrate respectively the current Im flowing between the propulsion battery and the motor, and a maximum current defined as explained previously.

In this embodiment illustrated, the management method combines in particular the following two conditions to place the onboard battery in charging configuration on the management system:

the voltage loss on account of the linking of the onboard battery maintains the voltage beyond the required minimum voltage, this being manifested by the curve 101 lying above the curve 102;

the current Im is less than the predefined maximum value, this being manifested by the curve 103 lying below the curve 104.

When both of these two conditions hold, the onboard battery is placed in series with the system, thereby allowing it to receive the current represented by the curve 105 in FIG. 16. This current corresponds to a continuous mean current represented by the curve 106, which is close to the setpoint current calculated for optimal recharging of the onboard battery.

The previous embodiments may advantageously be combined with a particularly advantageous architecture of batteries, which forms an integrated structure physically uniting the two batteries, such as is illustrated schematically in FIGS. 17 to 21.

In this architecture, the propulsion battery is composed of modules 112 or stages, laid out in series.

FIG. 17 makes it possible to detail by way of simplified example the possible structure of a stage of such a propulsion battery. As is apparent, each stage is disposed between two levels of potential, high and low, represented by two terminals, high 118 and low 117. Each module 112 comprises several cells 111, arranged in parallel with distinct branches extending between the two levels of potential, high and low, of the module. Each cell 111 is associated with its own inherent switch 113, arranged in series with its cell (on the branch between the two levels of potential, high and low, of the module), which makes it possible to disconnect the cell from the remainder of the propulsion battery by opening it: accordingly, we shall call it a "cell switch 113" subsequently. Moreover, each module 112 also comprises a switch 114 in parallel with all the cells 111 of the module 112, thus making it possible to short-circuit the module as a whole: accordingly, we shall call it a "module switch 114" subsequently.

The various switches 113, 114 are embodied with the aid of power transistors, preferably transistors of NMOS type, which afford a gain in conductivity in their passing state with respect to PMOS transistors which could as a variant be used. As a variant, it is also possible to use other types of transistors such as bipolars, FETs, JFETs, IGBTs, etc., in silicon, silicon carbide, or Gallium arsenide technology etc. It is also possible to place several transistors in parallel to better ensure the passage of the current. All these transistors are associated with diodes 125, 126 mounted in parallel, which are integrated into the transistors if they are NMOS discrete power transistors or as a variant are distinct diodes, to represent their characteristic of allowing the current to pass in the reverse direction.

Finally, a control circuit 127, generally called a "driver", is energized electrically through links 128 allowing it to recover a voltage difference corresponding substantially to the voltage of the most charged cell of the stage, slightly decreased by a voltage drop (for example close to 0.6 V) at the level of the diodes 140 arranged in the links 128. The function of this control circuit 127 is to generate control signals 141 towards the various transistors forming the switches explained hereinabove so as to actuate them, thus fulfilling a control function in respect of the switches. In a similar manner and not represented for the sake of clarity of the figures, all the electronic components of the module may be energized according to the same solution, like a computer chip making it possible to estimate the state of the switches, an optional communication system, etc. This local energizing by at least one cell 111 of a module 112 relates lastly to all the components requiring energizing. The control circuit 127, energized by its associated module 112 or indeed by a neighbouring module 112, is then electrically isolated from the other modules and/or electrical potentials outside the module. Such an embodiment exhibits the advantage of removing the risk of driving a certain transistor with a very different potential from that of the stage, which could lead to its destruction or to its short-circuiting. Moreover, this solution affords the additional advantage of allowing a reduction in the connections between the components of the control circuit and the energizing source, since it is possible to group them together a short distance from one another and from the voltage source, in particular by positioning the transistors as close as possible to the cells to be connected. Finally, the use of very short connections also greatly reduces any risk of short-circuiting, for example between two modules.

According to a beneficial embodiment, each cell 111 moreover comprises at least one measurement sensor, not represented, for measuring a quantity characteristic of the state of the cell. This measurement sensor can for example measure the voltage and/or the intensity of current and/or the temperature at the level of the cell concerned. Each measurement sensor is moreover linked by a communication device to an intelligent device, local and/or remote, such as a computer chip of microcontroller type, which receives the measured values and implements a battery management method to determine a mode of optimized operation of the propulsion battery, by taking account of the measurements performed.

This optimized operation consists in fact in determining the switches 113, 114 which must be opened and closed. This configuration of the various switches of the battery can be modified in real time. This solution thus makes it possible for example to discard defective or overheated cells, to steer the current right inside each module, to balance each of the cells of the battery in real time. As a remark, the mean current demanded by the motor energized by the propulsion battery is in general much lower than the peak current demanded at greatest consumption, thereby allowing the battery to operate satisfactorily most of the time with a relatively significant number of disconnected cells, that is to say whose associated cell switch 113 is open, or indeed of disconnected modules, that is to say whose associated module switch 114 is closed, if the whole of a module is considered to be defective or to have overheated for example.

The implementation of such a structure, represented schematically in FIGS. 17 to 21, can be done by using one or more electronic boards, physically integrated at the level of the energy storage cells 111, to position the electronic components described hereinabove as close as possible to the cells and to form a perfectly integrated and compact set. By way of example, an electronic board in the form of a printed circuit can be positioned on the lower or upper face of each module and the propulsion battery can then comprise an electronic board between each module. As a variant, one and the same electronic board can unite the electronic components associated with several different modules, whose cells are disposed with an optimal footprint around this electronic board.

In the example described hereinabove, the method of management of the battery is implemented by the cooperation of a local control circuit 127, arranged at the level of each module 112, linked to a central computer 122 by a communication bus 121 and by way of an interface 137 forming a galvanic isolation. As a variant, not represented, a local processing circuit, which may be a microcontroller having a sufficient input/output number to interrogate the whole set of sensors, may participate in the intelligent management of the propulsion battery and of its switches, with or without assistance of a central computer 122.

FIG. 17 illustrates an implementation of such a propulsion battery architecture, comprising by way of example four modules of two cells 111. Advantageously, all the modules of the propulsion battery take the form of the structure described hereinabove, and are linked in series, the lower terminal 117 of an upper module representing the upper terminal 118 of a lower module. As a variant, each module may naturally comprise a different number of cells and the propulsion battery may comprise more modules. The propulsion battery comprises moreover four switches 186, 187, 188, 189, which are transistors according to this embodiment, driven respectively by the battery control circuits, by control links 190. These switches form an H-bridge making it possible to invert the output of the propulsion battery. Thus, by managing in a calculated manner the opening and the closing of the various switches of the battery, it is possible to emit a sinusoidal voltage, of desired phase and amplitude. If a 50-Hz wave is desired on output from the battery, it is necessary to undertake 50 closings/openings per second of the transistors of the H-bridge. The use of such a battery lastly allows flexible management by intelligently opening or closing the switches associated with the battery. It makes it possible in particular to fulfil the functions of the intermediate DC/DC converters or inverter generally used, and for example represented in FIGS. 3 to 5. Thus, the use of a propulsion battery based on such an architecture allows the implementation of electrical management systems similar to those represented in FIGS. 3 and 4 by removing the DC/DC converter 23 and the inverter 33.

According to the embodiment of FIG. 17, the onboard battery 24 of the vehicle is likewise arranged in series with the various modules of the propulsion battery and integrated into the structure described above, at the level of the lower end of the stack of modules. It also has its series switch 53 and its parallel switch 54, both driven by a specific control circuit 57 which is linked also to the same central computer 122 by the same communication bus 121, by way of an interface forming a galvanic isolation. The onboard battery can be associated advantageously with the electronic components comparable to those associated with the storage cells of a module and described above. Thus, measurement sensors, not represented, for measuring current, and/or voltage, and/or temperature, can be positioned at the level of the onboard battery 24 and linked by communication means to the control circuit 57 and/or to the computer 122. Through this architecture, the onboard battery is thus physically linked and integrated into the propulsion battery, to form a dual-function global battery, integrating the battery for propelling a motor and the onboard battery.

Figure 18:
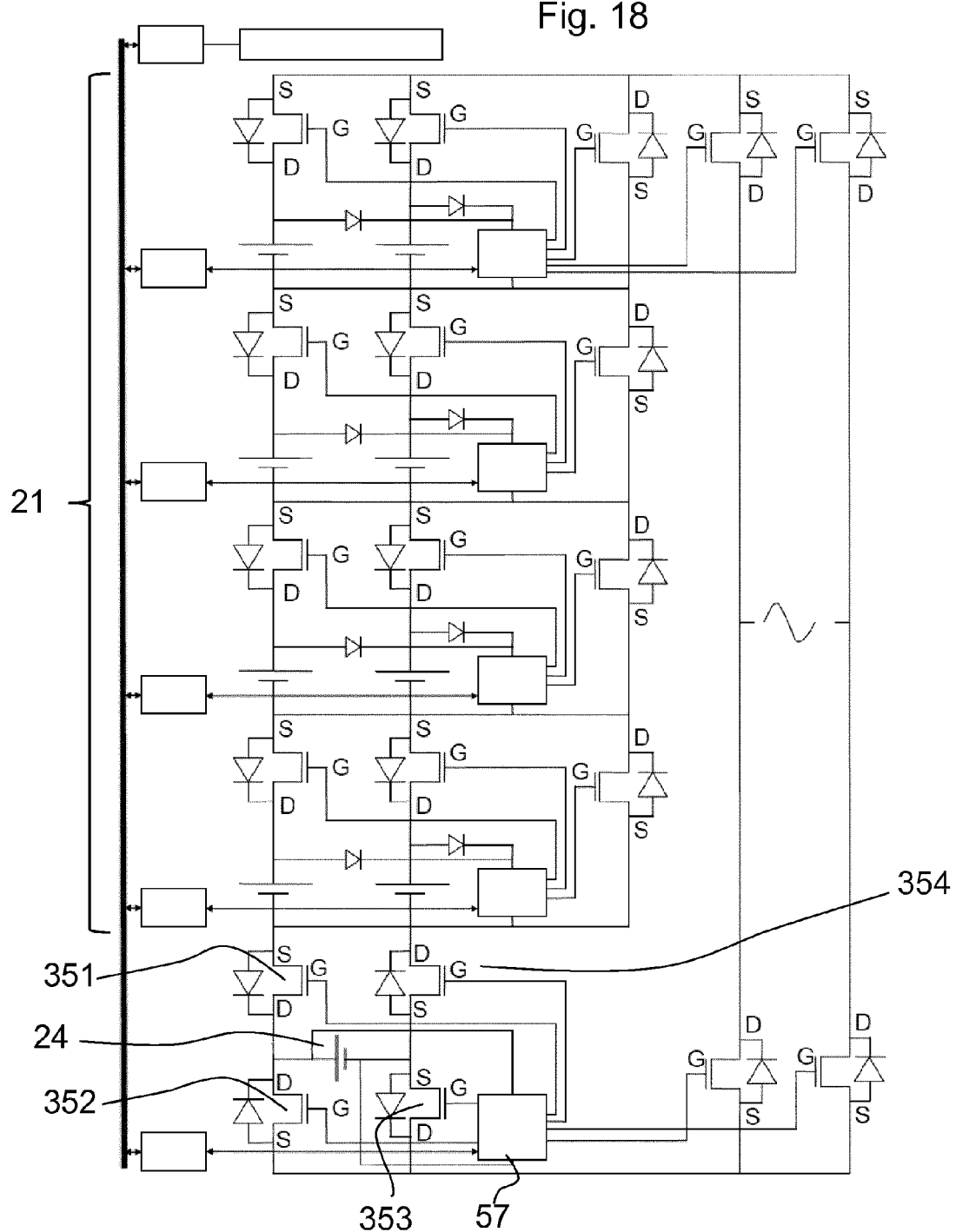

FIG. 18 describes an architecture very much like that of FIG. 17, which differs in that a device with several switches, similar to that of FIG. 8, is fitted at the level of the onboard battery 24. Naturally, all the variants represented in FIGS. 9 to 11 could also be implemented in such an architecture.

Figure 19:
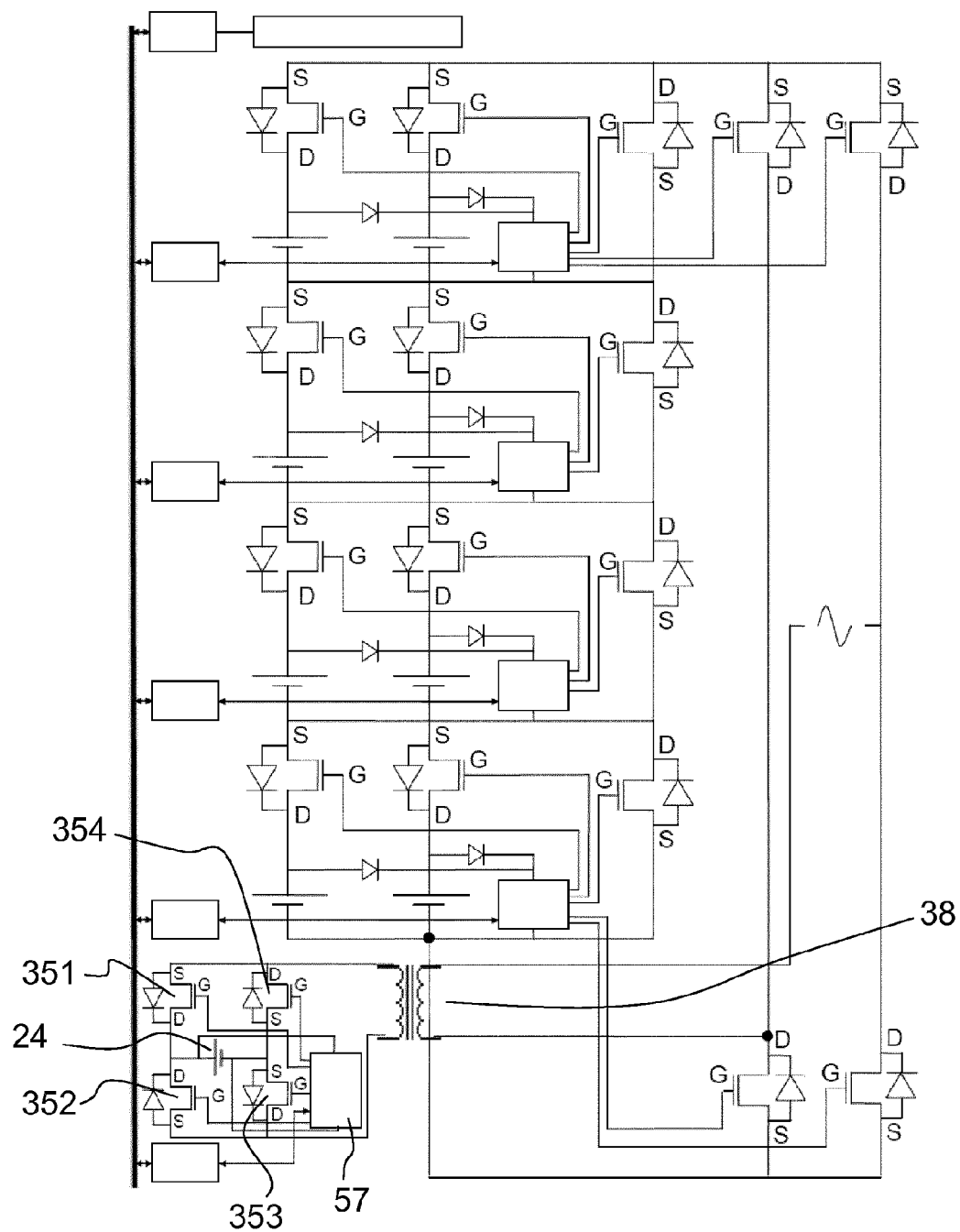
Figure 20:
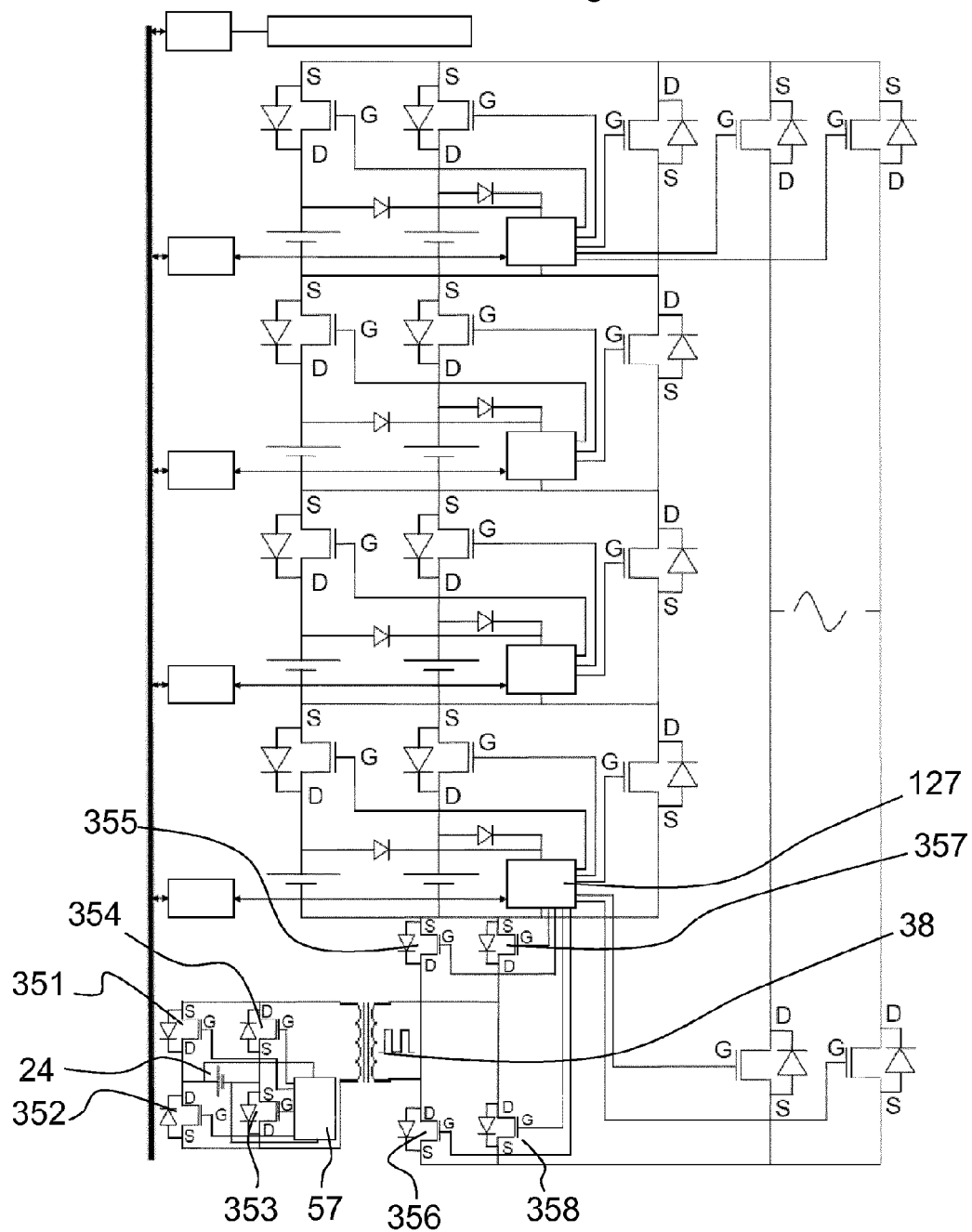

FIGS. 19 and 20 likewise describe architecture variants much like that of FIG. 17, in which galvanic isolation by a transformer 38 is implemented at the level of the onboard battery 24 of the vehicle, by implementing respectively the solutions described with reference to FIGS. 12 and 15. As a remark, in the embodiment of FIG. 20, the switches of the secondary circuit of the transformer 38 are energized by a control circuit 57 energized by the onboard battery, whereas the switches positioned at the level of the primary circuit of the transformer 38 are energized by a control circuit 127 of a neighbouring module of the propulsion battery.

Figure 21:
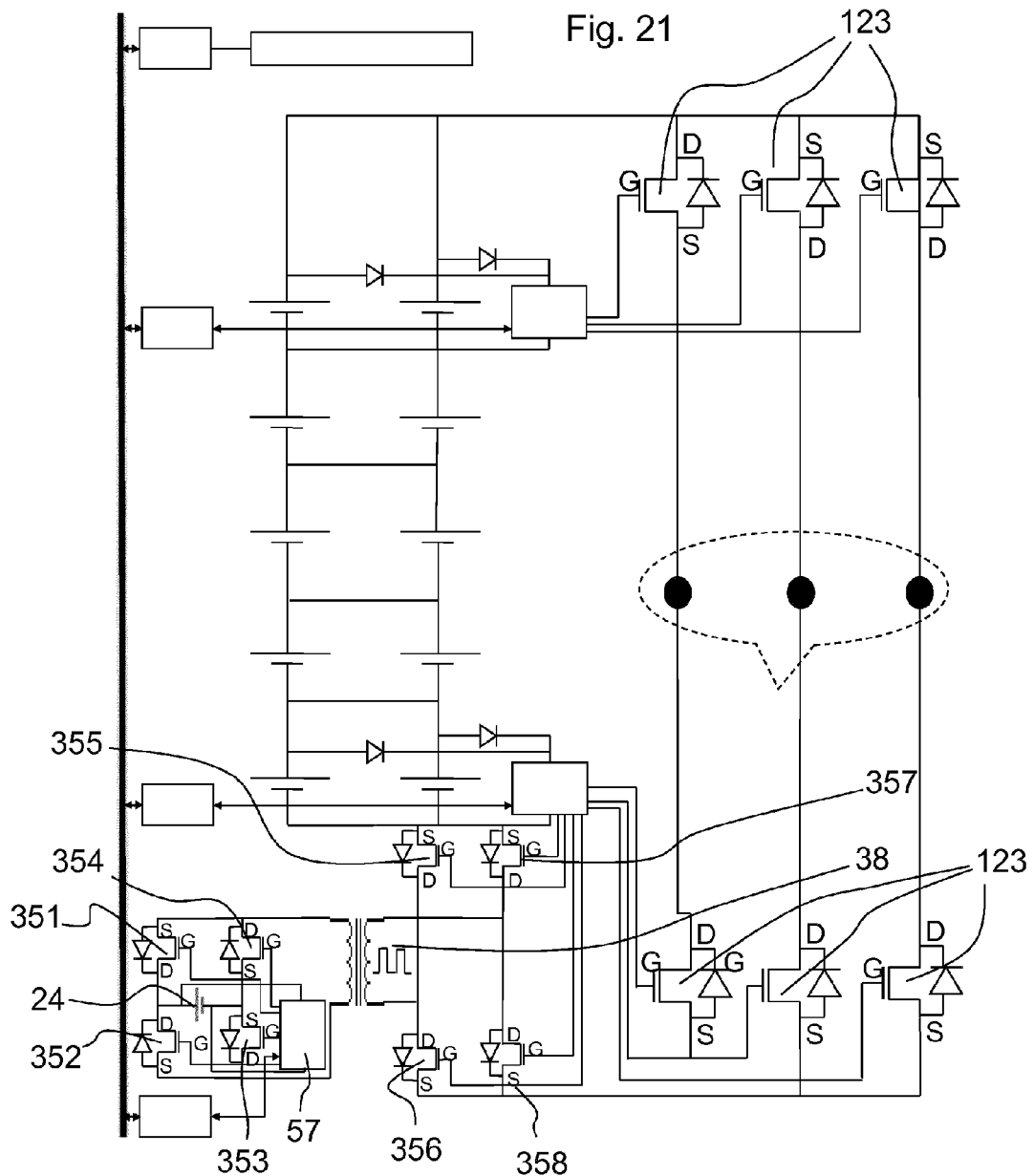

FIG. 21 illustrates a variant embodiment of FIG. 20, in which the propulsion battery provides a three-phase voltage, by virtue of a control of three branches of a three-phase inverter and a periodic chopping by switches 123 driven by control circuits energized by stages of the propulsion battery.

As was seen previously, it is naturally conceivable to combine several of the previous embodiments to obtain other variant embodiments. Moreover, the propulsion battery can comprise any architecture other than that described with reference to FIGS. 17 to 21. In particular, the various stages can comprise a different assemblage of storage cells and of switches than those represented.

The solutions described above are particularly well suited to an electrical system for managing energy aboard an automotive vehicle, of electric or hybrid type, such as a car, an aeroplane, a train, etc.

In a more general manner, the concept described above can be extended to any system which combines two voltage sources of different levels, and more precisely to an electrical management system comprising a first voltage source and a second source of lower voltage. Thus, the propulsion battery mentioned previously could be any other voltage source, such as a simple electrical network, a photovoltaic device, a fuel cell, an electrical energy generator, such as a dynamo or a turbine, etc. Likewise, the motor could be any load to be energized. Finally, the onboard battery may be replaced with any lower-voltage device, any second source of lower voltage than a propulsion battery or a first voltage source.

Thus, in the case of a photovoltaic device, the electrical energy production photovoltaic cells could correspond to the propulsion battery, to produce high-voltage energy powering for example an electrical network, and a lower-voltage network, on the basis also of a restricted number of photovoltaic cells or of an arbitrary battery, serving to energize an electronic device for management of the photovoltaic device could correspond to the onboard battery mentioned in the previous examples. Thus, the storage cells of the batteries represented in FIGS. 17 to 21 may as a variant be replaced by photovoltaic cells, optionally associated with capacitors, or by any other energy production and/or storage element.

Likewise, a system comprising a low-voltage energizing system for energizing or recharging ancillary devices such as a television, a computer, a mobile telephone, etc., can utilize a solution such as described in detail above.

The invention claimed is:

1. Electrical management system comprising a first voltage source linked to a load by a linking circuit and a second voltage source at lower voltage,
    wherein the linking circuit is a bidirectional linking circuit in which a first direction of flow of the current is oriented in a direction from the first voltage source to the load and a second direction of flow of the current s oriented in a direction from the load to the first voltage source,
    wherein the system includes a configuration in which the second voltage source is arranged in a series linking with the first voltage source and the load so that the series linking causes a voltage drop over the linking circuit linking the first voltage source to the load,
    wherein the system comprises a device comprising a rectifier bridge comprising diodes and/or switches, the device including a configuration in which the second voltage source is arranged in series on the bidirectional linking circuit whatever the direction of flow of the current in the bidirectional linking circuit.

2. The electrical management system according to claim 1, wherein the linking circuit comprises a first link linking a first terminal of the first voltage source to a first terminal of the load, and a second link linking a second terminal of the first source to a second terminal of the load, the second voltage source being arranged in series with one of the first or second links.

3. The electrical management system according to claim 1, comprising an inverter and/or a DC/DC converter, electrically attached to the first voltage source upstream of the second voltage source or electrically attached to the load downstream of the second voltage source.

4. The electrical management system according to claim 1, wherein the second voltage source is an onboard battery and wherein the system comprises a charger arranged in series with the linking circuit linking the first voltage source and the load able to allow the charging, by-passing, and/or isolation of the onboard battery.

5. The electrical management system according to claim 4, comprising at least one switch making it possible to disconnect the second voltage source from the linking circuit linking the first voltage source and the load.

6. The electrical management system according to claim 1, comprising at least one switch making it possible to disconnect the second voltage source from the linking circuit linking the first voltage source and the load.

7. The electrical management system according to claim 5, wherein the charger comprises a transformer, the onboard battery being arranged on the secondary circuit of the transformer which forms a galvanic isolation.

8. The electrical management system according to claim 7,
wherein the linking circuit comprises a first link linking a first terminal of the first voltage source to a first terminal of the load, and a second link linking a second terminal of the first source to a second terminal of the load, the second voltage source being arranged in series with one of the first or second links, and
wherein the primary circuit of the transformer is arranged in series with the first or second link, and wherein the primary circuit comprises several switches for generating a non-continuous and/or high-frequency current and/or at least one by-pass of the onboard battery arranged at the level of the secondary circuit.

9. The electrical management system according to claim 1, comprising at least one sensor measuring a datum characteristic of the second voltage source and a communication device for transmitting the characteristic datum to a management unit.

10. The electrical management system according to claim 1, wherein the first voltage source comprises a structure of several modules arranged in series, each module comprising a lower terminal and an upper terminal, and wherein the second voltage source or an associated charger is arranged in series with the first voltage source and comprises a terminal common to one of the modules of the first voltage source, and comprises at least one switch making it possible to disconnect the second voltage source from the first voltage source.

11. The electrical management system according to claim 1, comprising at least one control circuit for a switch making it possible to disconnect the second voltage source from the first voltage source, the control circuit being energized electrically directly by the second voltage source.

12. The electrical management system according to claim 10, wherein a module of the first voltage source comprises at least one switch and a control circuit for the switch, the control circuit being energized electrically directly by at least one cell of a module of the first voltage source, the at least one switch being from among:
a cell switch for connecting or disconnecting a particular cell of the first voltage source;
a parallel switch, for optionally by-passing a particular cell of the first voltage source;
a module switch, for optionally by-passing a module of the first voltage source;
a switch for optionally by-passing several modules simultaneously of the first voltage source;
a switch for optionally inverting the voltage output by the first voltage source;
a series/parallel inversion switch for arranging in series or in parallel certain sub-parts of the first voltage source;
an additional switch for arranging two cells in series or in parallel.

13. The electrical management system according to claim 12, comprising at least one sensor for measuring a quantity characteristic of the state of a cell of the first voltage source, and wherein a control circuit controls a switch associated with the cell as a function of the quantity characteristic of the state of the cell.

14. The electrical management system according to claim 10, further comprising a communication bus for communicating with a central computer, the two voltage sources being linked to the communication bus towards the same central computer.

15. The electrical management system according to claim 10, comprising an electronic board arranged between each module of the first voltage source and between a module and the second voltage source or a single electronic board on which are arranged all the cells of the first voltage source and the second voltage source or several electronic boards each associated with several modules of the first voltage source, the second voltage source being linked to one of these electronic boards.

16. The electrical management system according to claim 1, wherein the first voltage source is a propulsion battery and wherein the load is a DC motor or three-phase motor.

17. Electric or hybrid automotive vehicle comprising an electrical management system according to claim 1, the first voltage source being a propulsion battery of the vehicle, the load being a propulsion motor of the vehicle, and the second voltage source being an onboard battery of the vehicle.

18. Photovoltaic device, comprising an electrical management system according to claim 1, the first voltage source being an electrical generating device comprising photovoltaic cells, the load being an electrical network, and the second voltage source being a battery or a photovoltaic device which provides a low voltage to a device for managing the electrical generating device.

19. Method of management of an electrical management system according to claim 1 comprising two voltage sources, the method comprising a step of linking the second low voltage source with a linking circuit linking the first voltage source and the load so that the series linking of the second voltage source causes a voltage drop over the linking circuit linking the first voltage source to the load.

20. The method of management of an electrical management system according to claim 19, comprising a step of compensating the voltage drop caused by the linking of the second low voltage source with the linking circuit.

21. The method of management of an electrical management system according to claim 19, wherein the second voltage source is an onboard battery, and wherein the method comprises a step of charging the onboard battery through the series linking with the linking circuit, the charging step depending on the following prior steps:
   estimation of the state of charge and/or state of health of the second voltage source;
   charging of the second voltage source when the voltage drop caused on the linking circuit is compatible with the maintaining of a voltage at the input of the load beyond a predefined value and/or when the current flowing in the linking circuit does not exceed a predefined maximum value.

22. The method of management of an electrical management system according to claim 20, comprising implementing an alternation of linking and disconnection of the second voltage source on the linking circuit according to a duty cycle which makes it possible to achieve on average a setpoint current at the level of the second voltage source.

23. The method of management of an electrical management system according to claim 19, wherein the second voltage source is an onboard battery, and wherein the method comprises a step of connecting in series of the onboard battery so as to limit the power returned to the first source and the associated micro-cycles.

24. Electrical management system comprising a first voltage source linked to a load by a linking circuit and a second voltage source at lower voltage,
   wherein the system includes a configuration in which the second voltage source is arranged in a series linking with the first voltage source and the load so that the series linking causes a voltage drop over the linking circuit linking the first voltage source to the load,
   wherein the second voltage source is an onboard battery and wherein the system comprises a charger arranged in series with the linking circuit linking the first voltage source and the load able to allow the charging, by-passing, and/or isolation of the onboard battery,
   wherein the system comprises at least one switch making it possible to disconnect or otherwise the second voltage source from the linking circuit linking the first voltage source and the load,
   wherein the charger comprises a transformer, the onboard battery being arranged on the secondary circuit of the transformer which forms a galvanic isolation,
   wherein the linking circuit comprises a first link linking a first terminal of the first voltage source to a first terminal of the load, and a second link linking a second terminal of the first source to a second terminal of the load, the second voltage source being arranged in series with one of the first or second links, and
   wherein the primary circuit of the transformer is arranged in series with the first or second link, and wherein the primary circuit comprises at least one of (i) several switches for generating a non-continuous and/or high-frequency current and/or at least one by-pass of the onboard battery arranged at the level of the secondary circuit, and (ii) several switches and/or diodes, of the type of a rectifier bridge based on diodes or switches, at the level of the secondary circuit, so as to be able to disconnect the onboard battery from the secondary circuit and/or to be able to use it whatever the direction of the induced current.

25. Electrical management system comprising a first voltage source linked to a load by a linking circuit and a second voltage source at lower voltage,
   wherein the system includes a configuration in which the second voltage source is arranged in a series linking with the first voltage source and the load so that the series linking causes a voltage drop over the linking circuit linking the first voltage source to the load,
   wherein the first voltage source comprises a structure of several modules arranged in series, each module comprising a lower terminal and an upper terminal, and wherein the second voltage source or an associated charger is arranged in series with the first voltage source and comprises a terminal common to one of the modules of the first voltage source, and comprises at least one switch making it possible to disconnect the second voltage source from the first voltage source,
   wherein a module of the first voltage source comprises at least one switch and a control circuit for the switch, the control circuit being energized electrically directly by at least one cell of a module of the first voltage source, the at least one switch being selected from among:
      a cell switch for connecting or disconnecting a particular cell of the first voltage source;
      a parallel switch, for optionally by-passing a particular cell of the first voltage source;
      a module switch, for optionally by-passing a module of the first voltage source;
      a switch for optionally by-passing several modules simultaneously of the first voltage source;
      a switch for optionally inverting the voltage output by the first voltage source;
      a series/parallel inversion switch for arranging in series or in parallel certain sub-parts of the first voltage source;
      an additional switch for arranging two cells in series or in parallel.

26. The electrical management system according to claim 25, comprising at least one sensor for measuring a quantity characteristic of the state of a cell of the first voltage source, and wherein a control circuit controls a switch associated with the cell as a function of the quantity characteristic of the state of the cell.

* * * * *

UNITED STATES PATENT AND TRADEMARK OFFICE
CERTIFICATE OF CORRECTION

PATENT NO. : 9,948,095 B2  
APPLICATION NO. : 14/373239  
DATED : April 17, 2018  
INVENTOR(S) : Ghislain Despesse Page 1 of 1

It is certified that error appears in the above-identified patent and that said Letters Patent is hereby corrected as shown below:

In the Claims

Claim 1, Column 12, Line 56:
Change "the current s"
To --the current is--

Signed and Sealed this
Twenty-fifth Day of June, 2019

Andrei Iancu
*Director of the United States Patent and Trademark Office*